Dec. 7, 1965 H. POREPP Re. 25,935

METHOD OF MAKING SLIDE FASTENERS

Original Filed Jan. 13, 1959

INVENTOR:
HANS POREPP
BY
Richardson, Davis and Nardon
ATTY'S.

United States Patent Office

Re. 25,935
Reissued Dec. 7, 1965

25,935

METHOD OF MAKING SLIDE FASTENERS

Hans Porepp, Wangen (Bodensee), Germany, assignor to Opti-Holding A.G., Glarus, Switzerland Original No. 3,001,904, dated Sept. 26, 1961, Ser. No. 786,567, Jan. 13, 1959. Application for reissue Sept. 24, 1963, Ser. No. 311,267
8 Claims. (Cl. 156—66)

Figure 1:
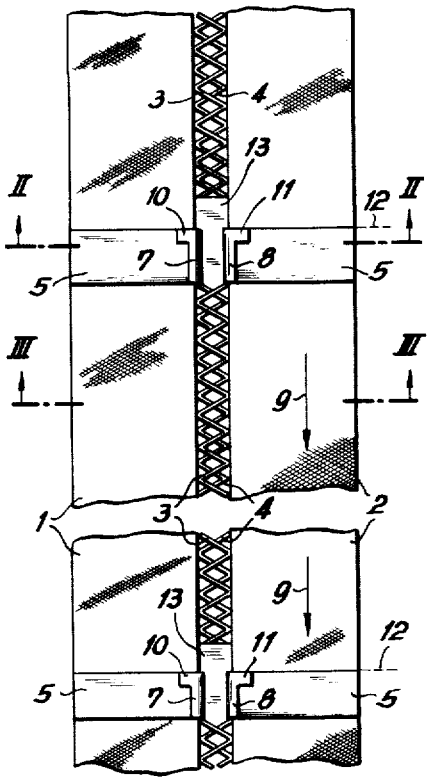

Matter enclosed in heavy brackets [ ] appears in the original patent but forms no part of this reissue specification; matter printed in italics indicates the additions made by reissue.

The present invention relates to a method for manufacturing [sliding clasp] *slide* fasteners made of two endless stringer tapes having each a continuous so-called toothed bar or toothed edge made of a molecularly orientable plastic material, which are brought into mutual engagement. Such toothed bars may for example be helically wound or helically [displaced] *deformed* from polyamide threads and be bent in U-shape [manner] about the median longitudinal line, the stretched material affecting the attachment by profiling, flattening or the like. The toothed bars may however also be molecularly oriented by a shaping pressure which is exerted on a plastic thread, and at the same time provided with attachment elements.

In all [sliding clasp] *slide* fasteners as hitherto constructed the two fastener-*supporting* stringer tapes [or textile stringer tapes] have extended at both ends beyond the toothed bars or member rows, for example by approximately 2 to 3 cm., and these ends have had to be turned down in order to avoid fraying when sewing the fastener in a garment or the like and in order to obtain a good closing of the fastener. Furthermore, the two fastener chains have had to be provided with separate end stops which constitute a stop member for the slider of the fastener.

The present invention provides a simple method of avoiding fraying of the ends of the textile stringer tapes by welding thermoplastic foils [on or in] *onto* the tapes.

According to the method of the present invention, strips of a thermoplastic material are welded on the two engaged fastener chains, which may be fed from a drum or the like, at distances corresponding to the desired fastener length, either on one side or advantageously on both sides and transverse to the longitudinal direction of the fastener, said strip material being welded by pressure and heat to the two toothed rows in such a manner that a [longitudinal] *longitudinally* directed separating portion is formed centrally between the two toothed rows [,] and each toothed row forms with the two strips a longitudinally directed bead on the internal edge of the textile stringer tape [which is] *this bead being* widened outwardly at [the edge of the strips remote from the direction of advance] *a location remote from one of the strip edges* in order to form a stop member, the two chains being *thereupon* completely [separated] *severed* in a transverse direction. In this manner fraying of the [start] *ends* of the two textile stringer tapes of the fastener is prevented and, by the shaping weld of the transverse strips, the end stops of the fastener are simultaneously made, said end stops limiting the slider movement. The slider, after separation or opening of the two fastener chains, is slid on from the other end whilst simultaneously making engagement with the toothed bars. This end is then closed in a simple manner by means of a transverse seam, it being possible for the transverse seam to effect at the same time the joining with the garment or the like. By means of this method according to the invention it is possible to manufacture [sliding clasp] *slide* fasteners or [sliding clasp fastener] *slide-fastener* chains without waste. It should be noted in particular that hitherto in the manufacture of such fasteners it has also been necessary to remove the toothed bar from the two protruding textile [stringer tape] *stringer-tape* ends, since initially the endless textile stringer tapes had to be provided with endless toothed bars for manufacturing reasons.

Finally it is also possible according to the invention to shape the toothed bars with the narrow transverse strips in such a manner that they assume the shape of [plugs] *tips*, as is necessary with completely separable fasteners, one [plug] *tip* being then connected to a [case part,] *socket* in which the other [plug] *tip* may be inserted, in [a] known manner, in the longitudinal direction of the fastener.

Figure 4:
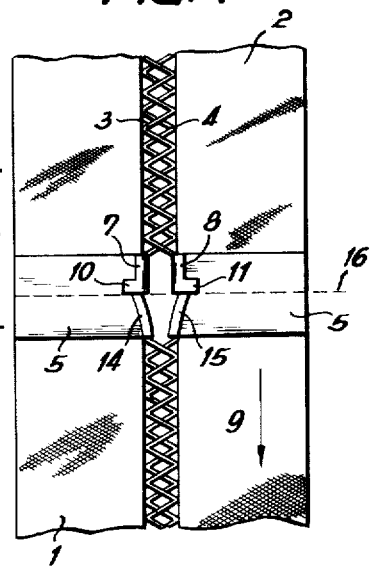
Figure 2:
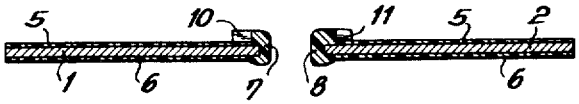
Figure 3:
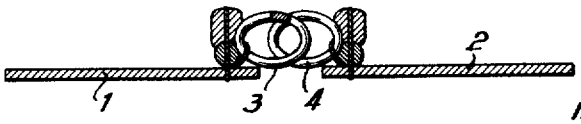

The method according to the invention will now be further described with reference to the accompanying drawing[s] in which:

FIGURE 1 shows a plan view of two [sliding clasp fastener] *slide-fastener* chains brought into engagement, having narrow transverse strips of thermoplastic material welded on and shaped, FIGURE 2 shows an enlarged transverse section along the line II—II of FIGURE 1, FIGURE 3 shows an enlarged transverse section along the line III—III of FIGURE 1, FIGURE 4 shows a plan view of a modified embodiment.

Referring to FIGURES 1 to 3, two endless stringer tapes 1 and 2 are each provided with an endless toothed bar 3, 4 made of a molecularly oriented plastic material, for example a polyamide, polyurethane or the like. The toothed bars may have any desired construction, but in this embodiment they consist of helically wound profiled polyamide threads which are sewn in a known manner to the textile stringer tapes 1 and 2. The two fastener chains 1, 3 and 2, 4 are brought into mutual engagement and wound on a drum or the like.

In order to make individual [sliding clasp] *slide* fasteners of the desired length, the two fastener chains which are in engagement are [run-off] *unwound* from the drum and are covered, at points spaced according to the fastener lengths desired, either on one side or on both sides, with narrow strips 5 and 6 made of a thermoplastic foil and extending transversely of the stringer tapes. Said strips are first joined to the textile stringer tapes 1 and 2 by means of a light pressure and heat. Thereafter, either at the same place or after a further run of the fastener[s] chains by a distance corresponding to one fastener length[,] there [occurs] *is exerted* a shaping pressure with the application of heat, by means of which the two strips 5 and 6 are permanently welded to the two stringer tapes 1 and 2 and by means of which at the same time the two toothed bars 3 and 4 are welded to the thermoplastic strips 5 and 6. This is effected in such a manner that in the first instance a separation and additionally a shaping is caused centrally between the two fastener chains in the longitudinal direction over the width of the strips 5, 6, by means of which *there is formed on each of the confronting tape edges* a bead-like thickening 7, 8 [occurs on the two facing stringer tape edges,] which is widened outwardly at the edge [furthest away from] *facing opposite* the direction of advance 9 of the narrow thermoplastic strips 5, 6. These widened parts 10 and 11 constitute the end stops of a fastener, when the endless chains have been [completely separated] *severed* in the transverse direction along the line 12, [so that] these end stops [prevent] *preventing* the slider from sliding off the fastener chains.

For carrying out the shaping and welding process, a pair of welding dies [is] *are* employed [, the] *whose* facing surfaces [of which having] *have* a profile corresponding to the desired shaping of the beads 7, 8 and of the widened parts 10, 11. Furthermore these dies are advantageously constructed in such a manner that a small piece of the toothed bars which extends [along] *beyond* the line 12 against the direction of advance 9 is also welded down at 13. Then the material of this [welded down] *welded-down* area 13 as well as the material remaining between the beads 7 and 8 is punched out and the [complete] transverse [separation] *severing* of the fastener chains is [only] subsequently effected along the line 12. Thereupon the two engaging chains of the manufactured fastener having the desired length are separated from one another or opened and now a slider may be slid on the two chains, the [punched out] *punched-out* part 13 of the toothed bars facilitating the placing [on] of the slider [or may even be an essential initial requirement in order to render it possible to position the slider in] *on* the chains. After the slider has been [placed on chains] *so positioned*, the two textile stringer tapes 1 and 2 are joined together at the fastener end, at or adjacent the level of the area 13, by means of a transverse seam in such a manner that an end part is no longer necessary. It is however also possible to proceed in such a manner that this transverse seam is produced when sewing the fastener in a garment. In the case of [large scale] *large-scale* users of [sliding clasp] *slide* fasteners it is of course possible to supply continuous [sliding clasp] fasteners in such a manner that the separation of the endless strip into individual fastener lengths along the line 12 is first effected by the user who then also places the slider on the chains.

The method according to the invention may also be used in manufacturing completely separable [sliding clasp] *slide* fasteners of the type in question. In this connection the method used is shown in FIGURE 4, and consists in that the transverse strip 5, 6 made of thermoplastic material to be welded on one side or on both sides is chosen somewhat wider than in the case of FIGURE 1. A shaping weld is again effected in such a manner that the toothed bars 3 and 4 of the two engaged fastener chains form, with the two transverse strips on the facing [stringer tape] stringer-tape edges, two [plugs] *tips* 14 and 15 [on] to which are attached, [counter] *rearwardly with reference* to the direction of advance *9*, the widened parts 10 and 11[,] with the two longitudinally extending beads 7 and 8[.] serving as end stops as described in *conjunction with* FIGURE 1. Then the thin material which remains between the [plugs] *tips* 14 and 15 and the beads 7 and 8 is punched out and finally the separation of the individual fastener lengths is effected on the transverse line 16 *intermediate the two parallel strip edges* in such a manner that the [plugs] *tips* 14, 15 form the end, and the beads 7, 8 with the widened parts 10, 11 form the beginning of two successive fastener lengths. *It will be noted that the stop members 10, 11 lie between one of the strip edges and line 16 whereas the tips 14, 15 extend between that line and the other strip edge.* After placing a slider on the chains, one of the [plugs] 14 or 15 is connected in any suitable manner to a [plug case,] *socket* into which the other [plug] *tip* is inserted in a detachable manner as is known in the art for producing a completely separable [sliding clasp] slide fastener.

Finally it should be stated that the transverse strips 5 and 6 must not constitute a hindrance for sewing the [fastener] stringer tapes 1 and 2 on to a garment, so that the material of these strips must be sufficiently soft that it is possible to sew through them.

Whilst particular embodiments have been described it will be understood that various modifications may be made without departing from the scope of this invention as defined in the claims.

I claim:

1. A method [for] *of* manufacturing [sliding clasp] *slide* fasteners [haivng] *having* two [fastener] stringer tapes which are each provided with a row of teeth made of a molecularly orientable plastic material *so as to constitute fastener chains* [and which are] adapted to be brought into engagement by means of a slider, [wherein] *comprising the steps of welding* strips of a thermoplastic material [are welded] on to at least one side of the two engaged fastener chains at distances corresponding to the desired fastener lengths, said strips extending transversely to the longitudinal direction of the fastener, next heat and pressure molding the strips and rows of teeth therebetween to form a longitudinally directed separating portion centrally between the two toothed rows and a longitudinally directed bead on the internal edge of [the textile] *each* stringer tape [which is], *said bead being* widened outwardly at [the edge of the strips] *a location* remote from *one of* [direction of advance in order] the *strip edges so as* to form a stop member, and finally transversely severing the tapes adjacent the stop members.

2. A method according to claim 1, in which a short portion of the toothed rows [attached on the side opposite the direction of advance] *adjacent said stop members* is flattened by heat and pressure, [which] *thereby forming a* flattened portion *which* subsequently, before the transverse [complete separation] *severing* of the fastener chains, is punched out together with the part remaining between the two beads.

3. A method according to claim 1, in which the two fastener chains are [completely separated in the transverse direction in the longitudinal zone of the beads in the direction of advance but before the widened parts forming the stops in such a manner that the beads in the form of plugs allow the construction of a fully separable fastener, and each welded zone constitutes the end of one fastener and the end stops at the beginning of the next fastener] *transversely severed along a line intermediate the strip edges, said stop members being formed between one of said strip edges and said intermediate line adjacent the latter, said beads being shaped into tips between said intermediate line and the other of said strip edges whereby, upon severing of the chains, said stop members form part of one and said tips form part of the other of two completely separable fastener sections.*

4. A method [for] *of* manufacturing [sliding clasp] *slide* fasteners having two [fastener] stringer tapes which are each provided with a toothed row made of a molecularly orientable plastic material [and which are] *so as to constitute fastener chains* adapted to be brought into engagement by means of a slider, [wherein] *comprising the steps of welding* strips of a thermoplastic material [are welded] on to both sides of the two engaged fastener chains at distances corresponding to the desired fastener lengths, said strips extending transversely to the longitudinal direction of the fastener [and being welded to] , *subjecting said strips and adjoining parts of* the two toothed rows [by] *to* pressure and heat in such a manner that a longitudinally directed separating portion is formed centrally between the two toothed rows, [and] each toothed row forming with the two strips a longitudinally directed bead on the internal edge of the [textile] *respective* stringer tape [which is] , *said bead being* widened outwardly at [the edge of the strips] *a location* remote from [the direction of advance in order] *one of the strip edges so as* to form a stop member [the two chains being] , *and* thereafter [completely separated] *severing the two chains* in a transverse direction.

5. A method according to claim 4, in which simultaneously with the manufacture of the two beads [serving as end stops] a short piece of the toothed rows [on the side opposite direction of advance] *adjacent said stop members* is welded down, *thereby forming a flattened portion* which subsequently, before the transverse [complete separation] *severing* of the fastener chains, is punched out together with the part remaining between the two beads.

6. A method according to claim 4, in which the two fastener chains are [completely separated in the transverse direction in the longitudinal zone of the beads in the direction of advance but before the widened parts forming the stops, in such a manner that the beads in the form of plugs allow the construction of a fully separable faastener, and each welded zone constitutes the end of one fastener and the end stops at the beginning of the next fastener] *transversely severed along a line intermediate the strip edges, said stop members being formed between one of said strip edges and said intermediate line adjacent the latter, said beads being shaped into tips between said intermediate line and the other of said strip edges whereby, upon severing of the chains, said stop members form part of one and said tips form part of two completely separable fastener sections.*

*7. A method of manufacturing slide-fastener sections from an elongated tape supporting along one edge an elongated toothed element interlockingly engageable with a like element on a confronting tape, said element consisting of a plastic material deformable under heat and pressure, comprising the steps of depositing strips of thermoplastic material on said tape, in contact with said element, at longitudinally spaced locations, shaping a part of said strip into an end stop and concurrently flattening an adjacent part of said element by the application of heat and pressure thereto, and severing said tape in the region of each strip along a transverse line adjoining said end stop.*

*8. A method of manufacturing slide-fastener sections from an elongated tape supporting along one edge an elongated toothed element interlockingly engageable with a like element on a confronting tape, said element consisting of a plastic material deformable under heat and pressure, comprising the steps of depositing strips of thermoplastic material on said tape, in contact with said element, at longitudinally spaced locations, shaping a part of said strip into an end stop and concurrently flattening an adjacent part of said element by the application of heat and pressure thereto, removing the flattened part of said element while leaving said end stop intact, and severing said tape in the region of each strip along a transverse line adjoining said end stop.*

References Cited by the Examiner

The following references, cited by the Examiner, are of record in the patented file of this patent or the original patent.

UNITED STATES PATENTS

| | | |
|---|---|---|
| 2,095,209 | 10/1937 | Brownsdon. |
| 2,274,722 | 3/1942 | Marinsky. |
| 2,438,615 | 3/1948 | Morin. |
| 2,582,456 | 1/1952 | Poux. |

EARL M. BERGERT, *Primary Examiner.*

D. J. DRUMMOND, *Assistant Examiner.*